US008811975B1

(12) United States Patent
    Oroskar (10) Patent No.: US 8,811,975 B1
(45) Date of Patent: Aug. 19, 2014

(54) VARYING ACCESS PROBE MESSAGE POWER BASED ON BATTERY LIFE AND DISTANCE TO BASE STATIONS

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 534 days.

(21) Appl. No.: 13/031,506

(22) Filed: Feb. 21, 2011

(51) Int. Cl.
    *H04W 4/00* (2009.01)
(52) U.S. Cl.
    USPC ........ 455/422.1; 455/434; 455/450; 455/464; 455/509; 455/574; 455/127.5
(58) Field of Classification Search
    CPC ..... H04W 36/00; H04W 48/00; H04W 48/20; H04W 16/00; H04W 16/02; H04W 29/02; H04W 72/00; H04W 72/08; H04W 72/10; H04W 72/12; H04W 52/00
    USPC ............. 455/434, 450, 464, 509, 574, 127.5, 455/422.1
    See application file for complete search history.

(56) References Cited

U.S. PATENT DOCUMENTS

| 7,953,040 | B2* | 5/2011 | Harikumar et al. | 370/329 |
| 2002/0082010 | A1* | 6/2002 | Koorapaty et al. | 455/434 |
| 2006/0199608 | A1* | 9/2006 | Dunn et al. | 455/552.1 |
| 2006/0221885 | A1* | 10/2006 | Nagaraj | 370/328 |
| 2008/0192666 | A1* | 8/2008 | Koskan et al. | 370/311 |
| 2010/0322198 | A1* | 12/2010 | Friday et al. | 370/332 |
| 2011/0051697 | A1* | 3/2011 | Wang et al. | 370/336 |
| 2011/0159931 | A1* | 6/2011 | Boss et al. | 455/574 |

OTHER PUBLICATIONS

Samuel Yang, "CDMA RF System Engineering," pp. 85-94, 113, and 141-145, 1998.

* cited by examiner

*Primary Examiner* — Olumide T Ajibade Akonai
*Assistant Examiner* — Shantell L Heiber (57) ABSTRACT

A wireless communication device (WCD) may transmit a first sequence of access probe messages to a radio access network (RAN) via a first wireless coverage area. The WCD may then transmit a second sequence of access probe messages to the RAN via a second wireless coverage area. Based on the first wireless coverage area being more preferable to the WCD than the second wireless coverage area, the WCD may use a negative inter-sequence power step for the power levels at which the WCD transmits the access probe messages of the first and second sequences. Thus, the WCD may transmit the first access probe message of the second sequence at a lower power than the first access probe message of the first sequence.

18 Claims, 6 Drawing Sheets

VARYING ACCESS PROBE MESSAGE POWER BASED ON BATTERY LIFE AND DISTANCE TO BASE STATIONS

BACKGROUND

A radio access network (RAN) typically includes base transceiver stations (BTSs), each of which radiate to define one or more wireless coverage areas. When a wireless communication device (WCD) attempts to establish an outgoing voice or data call via the RAN, the WCD may transmit one or more access probe messages to at least one BTS in range of or nearby the WCD. One of the purposes for doing so is to contact a BTS that can provide, via one of its defined wireless coverage areas, one or more wireless traffic channels to facilitate the call.

Typically, the WCD transmits a sequence of access probe messages to a first BTS via a first wireless coverage area defined by the first BTS. If the WCD receives a response to one of these access probe messages from the first BTS, the WCD may establish the call via the first wireless coverage area and proceed to use the first wireless coverage area to send and receive bearer data. However, if the WCD does not receive a response from the first BTS, the WCD may transmit another sequence of access probe messages to a second BTS via a second wireless coverage area defined by the second BTS.

If the WCD receives a response to one of the second sequence of access probe messages from the second BTS, the WCD may establish the call via the second wireless coverage area and proceed to use the second wireless coverage area to send and receive bearer data. However, if the WCD does not receive a response from the second BTS, the WCD may transmit another sequence of access probe messages to a third BTS via a third wireless coverage area defined by the third BTS. This process continues in a similar fashion until either the WCD receives a response from a BTS or the WCD gives up attempting to establish the call.

OVERVIEW

While the aforementioned access probe message transmission procedure may successfully establish calls in some scenarios, in other scenarios this procedure may lead to WCD establishing a call via a BTS that may be unable to provide a reasonable level of service to the WCD. Further, while doing so, the WCD may utilize a significant amount of its battery power.

A WCD usually transmits these sequences of access probe messages via wireless coverage areas in order of wireless coverage area preference. The WCD may prefer to establish calls via wireless coverage areas defined by geographically proximate BTSs, because there is likely to be less distortion, interference, and loss on the wireless air interface between the WCD and these nearby BTSs. Alternatively or additionally, the WCD may prefer to establish calls via a wireless coverage area defined by a BTS from which the WCD receives a strong signal. (While the WCD may receive stronger signals from wireless coverage areas defined by nearby BTSs, this is not always the case.) There is also likely to be less distortion, interference, and loss on the wireless air interface of such a BTS.

Thus, the WCD may transmit a sequence of access probe messages via a wireless coverage area defined by a nearby BTS and/or a BTS from which the WCD receives strong signals. Then, if the WCD does not receive a response to the access probe messages from this BTS, the WCD may transmit a sequence of access probe message via a wireless coverage area defined by a more distant BTS and/or a BTS from which the WCD receives weaker signals. The more BTSs to which the WCD sends a sequence of access probe messages, the more likely that the WCD will receive a relatively poor level of service from the BTS that eventually responds. Therefore, the wireless coverage areas defined by nearby BTSs and/or BTS from which the WCD receives strong signals may be more preferable than more distant BTSs and/or BTS from which the WCD receives weaker signals.

Further, both the process of acquiring a traffic channel of a less-preferred wireless coverage area, as well as using this wireless coverage area for transmission of bearer data via that traffic channel, may have a negative impact on WCD battery life. WCDs usually transmit access probe messages at a high level of power, and may transmit each subsequent access probe message in a given sequence at a successively higher level of power. Thus, the mere act of transmitting more than a few access probes may drain battery life. Additionally, if the WCD establishes a call via a geographically distant BTS or a BTS from which the WCD receives relatively weak signals, the WCD may have to transmit bearer data with a high level of power to increase the likelihood that this bearer data arrives at the BTS with sufficient signal strength for the BTS to detect. Thus, conducting a call with a less-preferred wireless coverage area may also consume battery life.

Therefore, in at least some of the aforementioned scenarios, there may be a tradeoff between call establishment success rates and battery life. For a WCD with a low remaining battery life, it may be preferable to allow some call establishments to fail if those call establishments, or the calls that might ensue therefrom, are likely to drain battery life at an excessive rate. In these situations, the WCD might be able to preserve battery life by waiting until the WCD is able to establish a call via a more preferable wireless coverage area.

Accordingly, in an example embodiment, a WCD may determine that a first wireless coverage area of a RAN is preferable to a second wireless coverage area of the RAN. The WCD may transmit a first sequence of access probe messages to the RAN via the first wireless coverage area. The first sequence of access probe messages may begin with a first initial access probe message.

The WCD may determine that the WCD has not received replies to any of the access probe messages in the first sequence. Then, in response to (i) not receiving a reply to any of the access probe messages in the first sequence, and (ii) the first wireless coverage area being preferable to the second wireless coverage area, the WCD may transmit a second initial access probe message to the RAN via the second wireless coverage area. Particularly, the WCD may transmit the second initial access probe message at a lower power than the WCD transmits the first initial access probe message. The WCD may further condition transmitting the second initial access probe message at a lower power than the WCD transmits the first initial access probe message on the remaining battery life of the WCD not meeting a battery life threshold.

In another example embodiment, a WCD may also determine that a first wireless coverage area of a RAN is preferable to a second wireless coverage area of the RAN. The WCD may transmit a first sequence of access probe messages to the RAN via the first wireless coverage area. The first sequence of access probe messages may begin with a first initial access probe message.

The WCD may determine that (i) the WCD has not received replies to any of the access probe messages in the first sequence, and (ii) a remaining battery life of the WCD does not meet a battery life threshold. Then, in response to (i) not receiving a reply to any of the access probe messages in the first sequence, and (ii) the remaining battery life of the WCD not meeting the battery life threshold, the WCD may transmit, to the RAN, a second initial access probe message. This second initial access probe message may be transmitted at a lower power than the WCD transmitted the first initial access probe message, and the WCD may transmit the second initial access probe message via the second wireless coverage area.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Network Architecture

Figure 1:
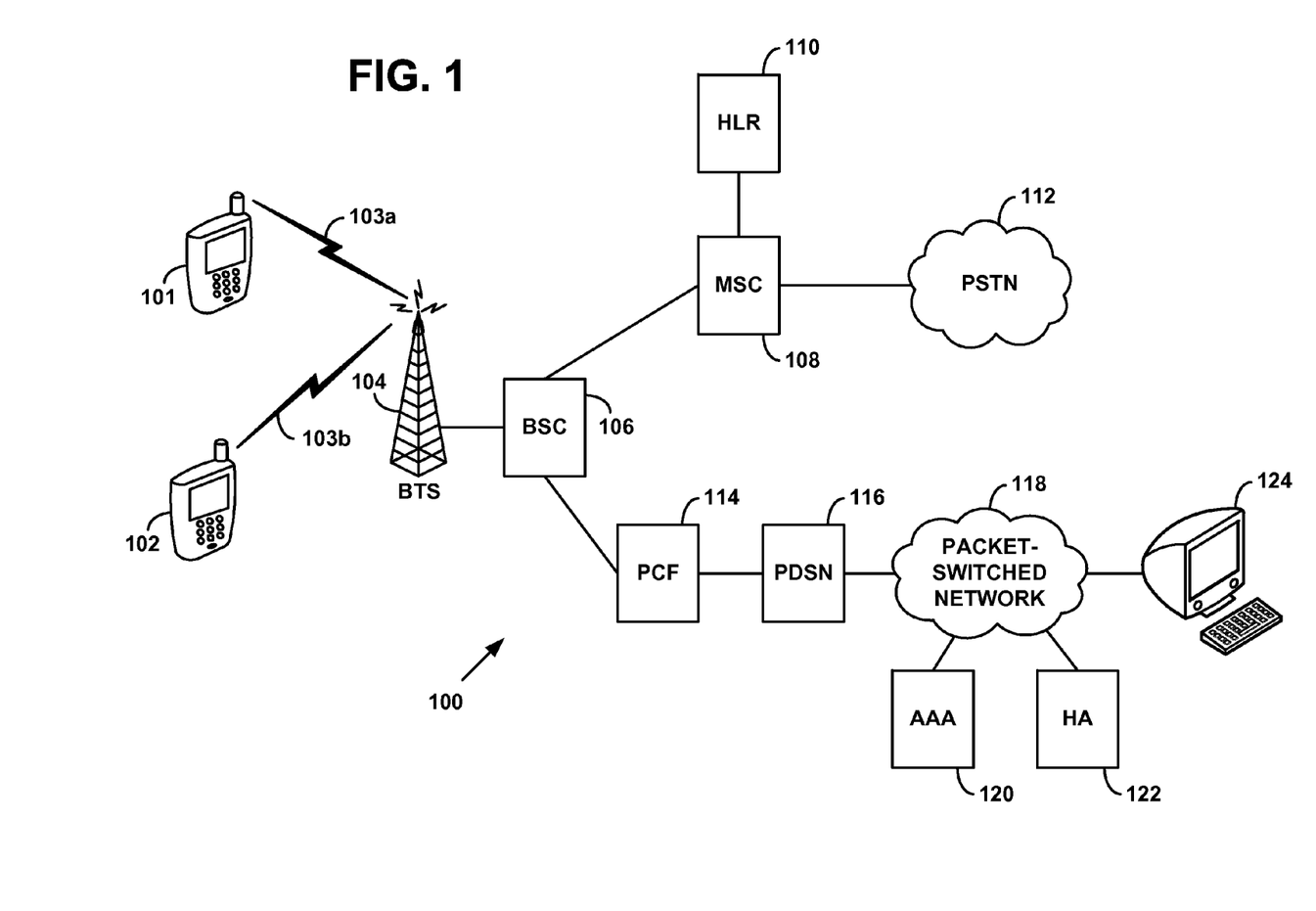
FIG. 1 depicts a RAN, in accordance with an example embodiment.

FIG. 1 is a simplified block diagram of a wireless communication system 100 in which example embodiments can be employed. WCD 101 may communicate over an air interface 103a with a BTS 104, which is, in turn, coupled to or integrated with a base station controller (BSC) 106. Similarly, WCD 102 may communicate over an air interface 103b with BTS 104. Transmissions over air interface 103a from BTS 104 to WCD 101 and over air interface 103b from BTS 104 to WCD 102 may represent "forward links" to the WCDs. Conversely, transmissions over air interface 103a from WCD 101 to BTS 104 and over air interface 103b from WCD 102 to BTS 104 may represent "reverse links" from the WCDs.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. As represented by its connection to public-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a Mobile Internet Protocol (mobile-IP) home agent (HA) 122, and a remote computer 124.

After acquiring a traffic channel over air interface 103a, WCD 101 may transmit a request to PDSN 116 for a connection to the packet data network. Then, following authentication of WCD 101 by AAA server 120, WCD 101 may be assigned an IP address by the PDSN or by HA 122, and may thereafter engage in packet-data communications with entities such as remote computer 124. Similar procedures may take place, via air interface 103b, for WCD 102.

Figure 2:
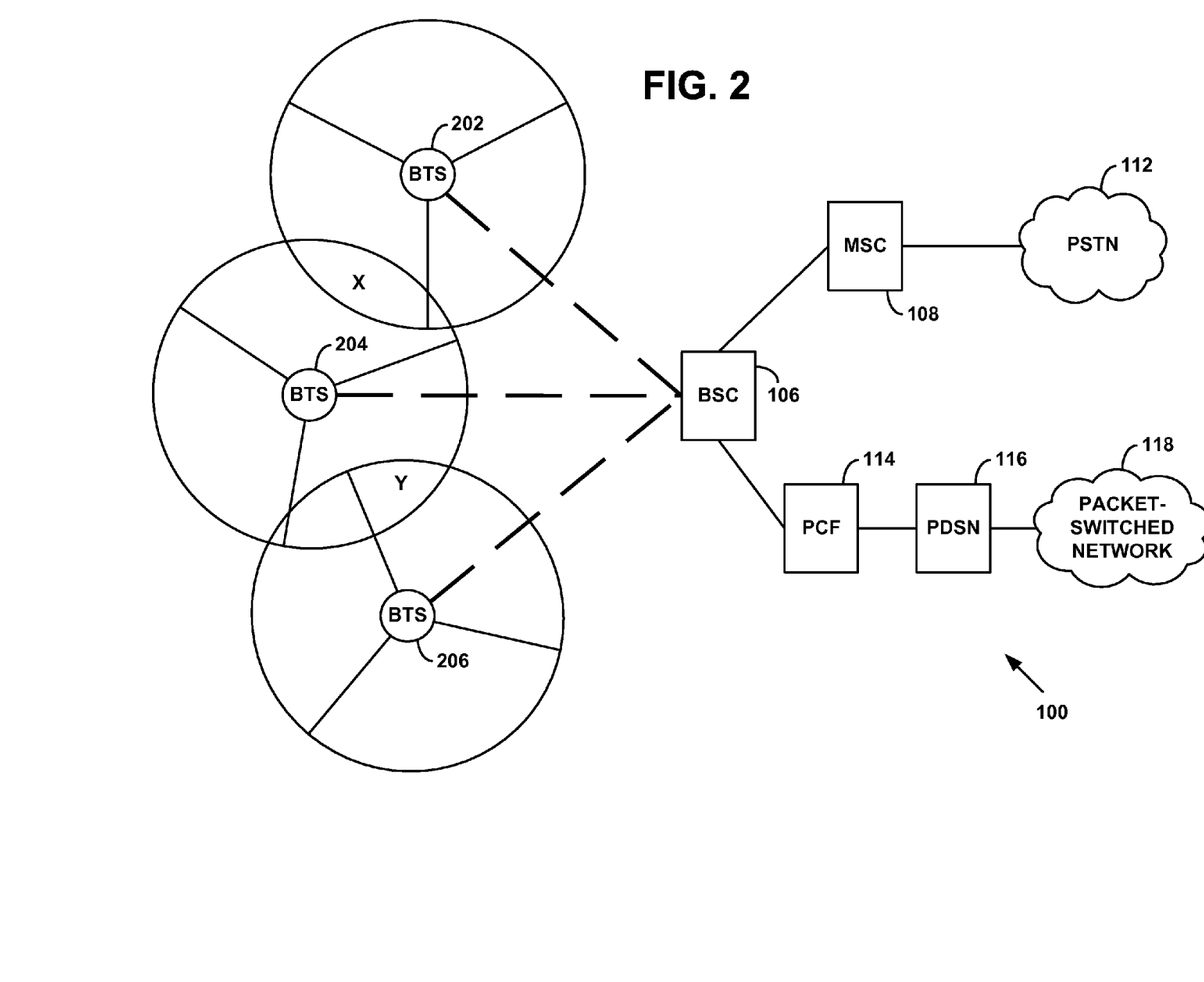
FIG. 2 depicts a RAN with several wireless coverage areas, in accordance with an example embodiment.

In practice, a BSC may serve multiple BTSs, each of which may define one or more wireless coverage areas. An example of such an arrangement is illustrated in FIG. 2, which shows BSC 106 in network 100 coupled with BTSs 202, 204, and 206. Each BTS is shown at the core of a respective circle representing wireless coverage, with each circle divided into three pie-shaped pieces representing individual wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas per BTS in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, a BTS's overall wireless coverage may not be circular, and may take on other shapes and arrangements instead.

A WCD may be within range of more than one wireless coverage area. To illustrate how this may occur, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1 and 2 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
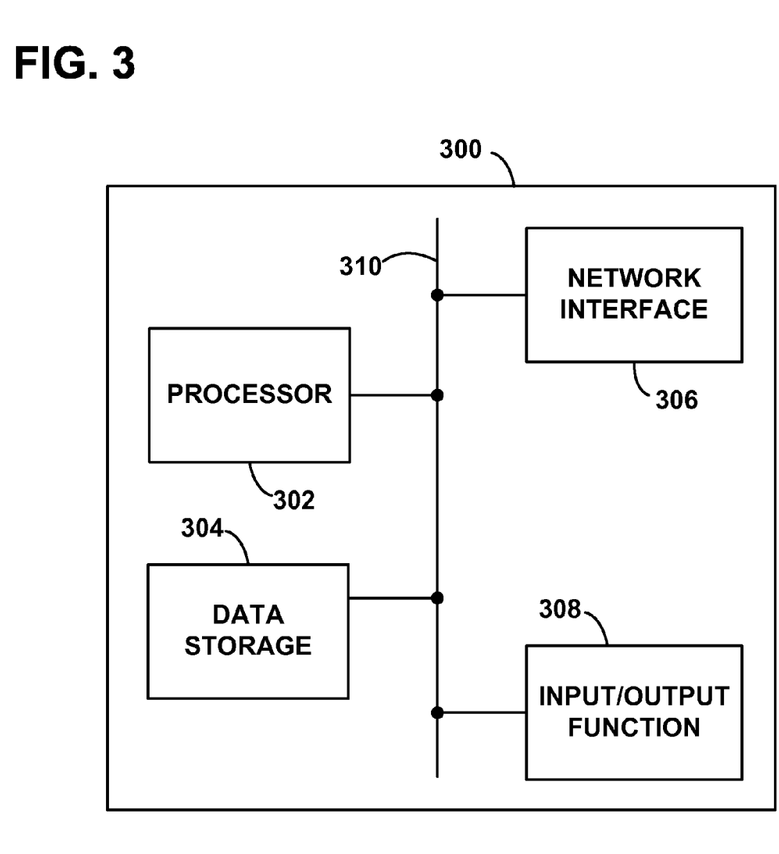
FIG. 3 is a block diagram of a RAN component, in accordance with an example embodiment.

FIG. 3 is a simplified block diagram exemplifying a WCD 300, illustrating some of the functional elements that may be found in a WCD arranged to operate in accordance with the embodiments herein. WCD 300 could be any type of mobile or wireless device, such as a mobile phone, tablet computer, laptop computer, electronic book reader, and so on.

WCD 300 may include a processor 302, a data storage 304, a network interface 306, and an input/output function 308, all of which may be coupled by a system bus 310 or a similar mechanism. Processor 302 may include one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 may store program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. Therefore, data storage 304 may be a non-transitory computer-readable medium, having stored thereon program instructions that, if executed by a processor (e.g., processor 302), cause the computing device to carry out any of the methods, processes, or functions disclosed in this specification or the accompanying drawings.

Network interface 306 may take the form of a wireless interface, such as IEEE 802.11 (Wifi), BLUETOOTH®, and/or a wide-area wireless interface operating in accordance with CDMA or other technologies. However, other forms of physical layer connections and other types of standard or proprietary communication protocols may be used over network interface 306. Furthermore, network interface 306 may comprise multiple physical interfaces.

Input/output function 308 may facilitate user interaction with example WCD 300. Input/output function 308 may comprise multiple types of input devices, such as a keyboard, a touch screen, a virtual keyboard, a microphone, a camera, and so on. Similarly, input/output function 308 may comprise multiple types of output devices, such as a screen, a speakers, one or more lights, etc.

II. Access Probe Messages in CDMA-Based Networks

The present invention will be described by way of example with reference to Code Division Multiple Access (CDMA) communications. However, it should be understood that the invention can apply to other families of protocols now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications from the BTS defining the given wireless coverage area to the WCD may be carried on a given frequency and may also be encoded (e.g., modulated) by the wireless coverage area's PN offset and a given Walsh code. Communications from the WCD to the BTS may also be carried by the given frequency and may be modulated by a PN long code assigned to the WCD.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry bearer data such as email, web browsing, voice, video, and so on. Similarly, on the reverse link, one or more codes may be reserved for use to define access channel(s), and the remainder may be assigned dynamically for use as traffic channels.

An idle WCD (i.e., a WCD that is not exchanging bearer data with a BTS) may register with a primary wireless coverage area, and listen to the paging channel of the primary wireless coverage area for incoming call indications, and other information, from the RAN. The RAN may transmit system parameter messages and/or neighbor list messages to the WCD via this primary paging channel. These messages may contain PN offsets of the pilot channels emitted by BTSs that define neighboring wireless coverage areas (e.g., wireless coverage areas defined by the RAN's BTSs or wireless coverage areas defined by nearby BTSs in different RANs).

The WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and register with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD engages in a voice or data call, the WCD may use the primary wireless coverage area's paging channel and access channel to establish the call. For example, when an idle WCD originates a new outgoing call (i.e., the WCD is the caller), the WCD may transmit a sequence of one or more access probe (or origination) messages to the RAN via the access channel of the primary wireless coverage area. Each access probe message may contain an identification of the WCD seeking to establish the call, as well information specific to the nature of the request, such as the type of call or session being sought, among other possible details.

Upon receiving an acknowledgement from the RAN via the primary wireless coverage area, the WCD may discontinue further access probe transmissions (if any remain) in the sequence, and wait for a channel assignment message from the RAN. If no acknowledgement is received within the sequence, the WCD may initiate one or more additional sequences of access probe transmissions until it either receives an acknowledgement (and a traffic channel assignment), or gives up attempting to gain access from the primary wireless coverage area. In the event of failure, the WCD may attempt to acquire access from a different wireless coverage area, possibly using the same procedure.

The failure of the RAN to acknowledge an access probe can be due to any of a number of reasons, including heavy loading conditions from multiple WCDs attempting access, lack of an available traffic channel, transmission of an access probe at too low a power level for the BTS defining the wireless coverage area to properly detect, and the location of the WCD being at too great a distance from the BTS.

The maximum number of access probe messages in a sequence that a WCD transmits to the RAN via a given wireless coverage area may be system-configurable. In some embodiments, each successive access probe message of the series is transmitted at a higher power than the preceding one. In other embodiments, all access probes in a series may be transmitted at approximately the same power.

Additionally, the WCD may wait a random delay between transmitting each successive access probe message in a sequence. The delay may provide an interval in which the RAN can acknowledge the previous access probe, and the random time between access probe message transmissions helps avoid "collisions" between access probe messages from different WCDs that are seeking access from the same particular sector during the same time frame.

Figure 4:
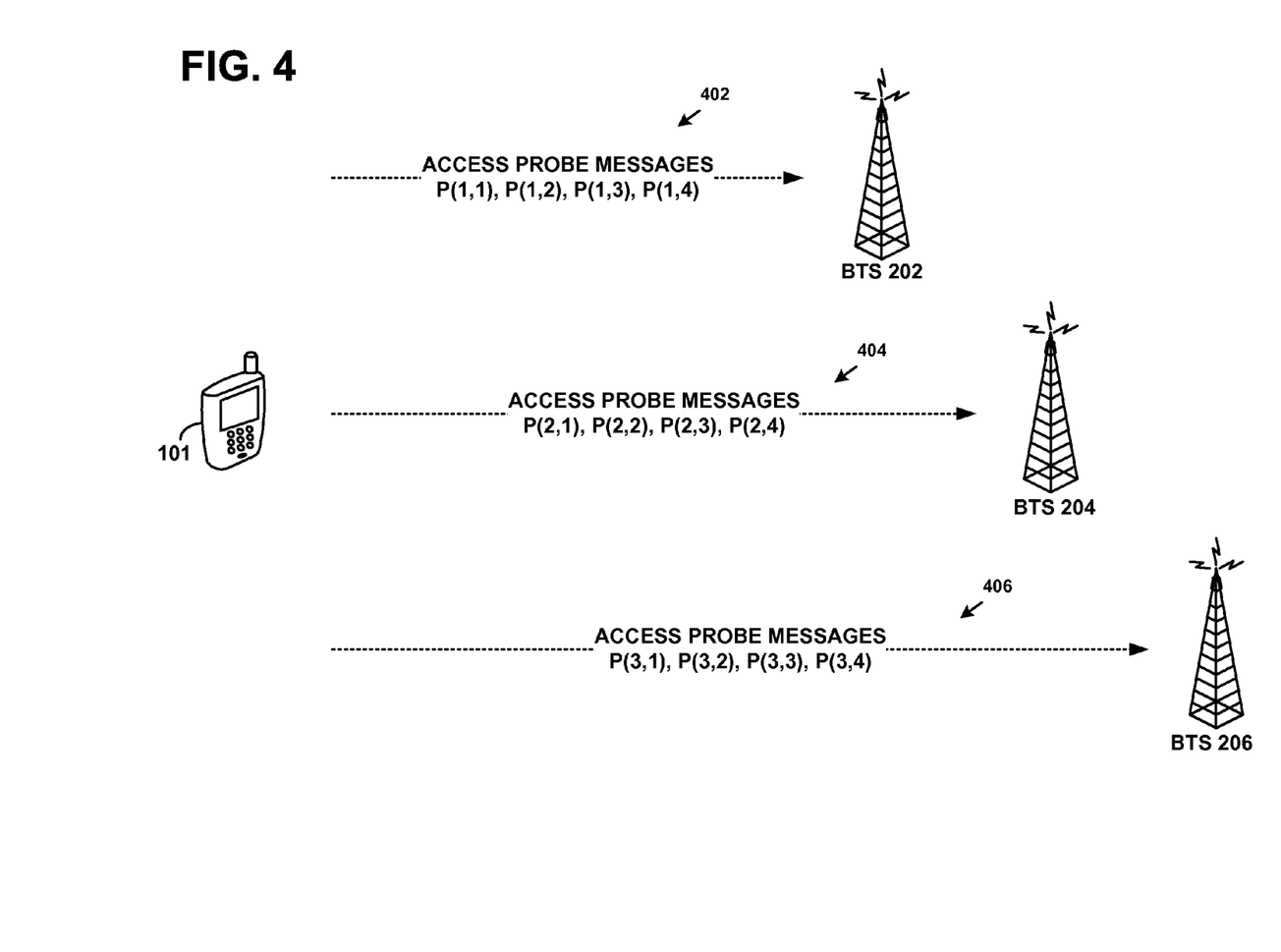
FIG. 4 is a message flow, in accordance with an example embodiment.

FIG. 4 provides an example of how a WCD may transmit, to a RAN, sequences of access probe messages to BTSs that define various wireless coverage areas. In FIG. 4, WCD 101 transmits three sequences, each containing four access probe messages. While each sequence is transmitted to a different BTS (and thus via a different wireless coverage area), it is possible that a WCD transmits access probe messages via two or more different wireless coverage areas defined by the same BTS.

At step 402, WCD 101 may transmit the first sequence via a wireless coverage area defined by BTS 202. This sequence contains access probe messages P(1,1), P(1,2), P(1,3), and P(1,4). The notation P(x,y) denotes the yth access probe message of sequence x. Not receiving a response to any of the access probe messages in the first sequence, at step 404 WCD 101 may transmit the second access probe sequence via a wireless coverage area defined by BTS 204. This sequence contains access probe messages P(2,1), P(2,2), P(2,3), and P(2,4). Not receiving a response to any of the access probe messages in the second sequence, at step 406 WCD 101 may transmit the third access probe sequence via a wireless coverage area defined by BTS 206. This sequence contains access probe messages P(3,1), P(3,2), P(3,3), and P(3,4).

FIG. 4 depicts BTSs 202, 204, and 206 being successively more distant from WCD 101. Thus, a wireless coverage area defined by BTS 202 is likely to be able to provide the best wireless coverage to WCD 101 out of wireless coverage areas defined by BTSs 202, 204, and 206. Similarly, a wireless coverage area defined by BTS 204 is likely to be able to provide the best wireless coverage to WCD 101 out of wireless coverage areas defined by BTSs 204 and 206.

For these reasons and/or other reasons, WCD 101 may transmit the first sequence to BTS 202. After BTS 202 fails to respond to any of the access probe messages in the first sequence, WCD 101 may transmit the second sequence to BTS 204. After BTS 204 fails to respond to any of the access probe messages in the second sequence, WCD 101 may transmit the third sequence to BTS 206, as BTS 206 is (for purposes of example) the only remaining BTS that can provide wireless coverage to WCD 101.

Thus, in the example depicted in FIG. 4, WCD 101 prefers a wireless coverage area defined by BTS 202 to a wireless coverage area defined by BTS 204. Likewise, WCD 101 prefers a wireless coverage area defined by BTS 204 to a wireless coverage area defined by BTS 206. These preferences may be based on the respective geographical distances between WCD 101 and each BTS. These geographical distances can be determined or estimated by WCD 101 in various ways. For example, each BTS may transmit its respective geographical coordinates to WCD 101 in an access parameters message, a system parameters message, or in some other message. These geographical coordinates may be, for instance, global positioning satellite (GPS) coordinates. Alternatively or additionally, WCD 101 may be provided with, or have access to, a mapping of BTS identifiers to BTS geographical coordinates. Thus, when receiving a BTS identifier, such as a PN code of a wireless coverage area defined by the BTS, WCD 101 may look up the BTS identifier in the mapping to determine the associated BTS's geographical coordinates.

On the other hand, wireless coverage area preference may be based on the strength at which WCD 101 receives signals (e.g., pilot signals) via each respective wireless coverage area. Thus, for example, WCD 101 may prefer a wireless coverage area defined by BTS 202 to a wireless coverage area defined by BTS 204 because WCD 101 receives stronger signals from BTS 202 than WCD 101 receives from BTS 204. Similarly, WCD 101 may prefer a wireless coverage area defined by BTS 204 to a wireless coverage area defined by BTS 206 because WCD 101 receives stronger signals from BTS 204 than WCD 101 receives from BTS 206.

Typically, WCD 101 will receive a stronger signal via a wireless coverage area defined by a nearby BTS than a wireless coverage area defined by a more distant BTS. However, this is not always the case, as the wireless path between a nearby BTS and WCD 101 may be obstructed (e.g., there may be a structure between the nearby BTS and WCD 101 blocking signals from the nearby BTS). Therefore, in some situations, WCD 101 may use the strength at which it receives signals from wireless coverage areas as a way of ranking the preference of these wireless coverage areas. Alternatively, the WCD may rank wireless coverage areas according to a combination of signal strength and geographical distance, or based on other factors. Regardless of what metric WCD 101 uses to rank the wireless coverage areas, WCD 101 may sort a list of two or more wireless coverage areas. Then, WCD 101 may determine that a wireless coverage area in the list is preferable to another wireless coverage area in the list based on the ordering of the list.

When WCD 101 transmits each sequence of access probe messages, WCD 101 may use the same pattern of initial access probe power and incremental power increases between access probe messages in the same sequence. An example of such a pattern may is shown in Table 1.

TABLE 1

Initial access probe message power of 0 dBm, with an intra-sequence power step of 4 dB and an inter-sequence power step of 0 dB.

| Access Probe Message | Power (dBm) | Access Probe Message | Power (dBm) | Access Probe Message | Power (dBm) |
| --- | --- | --- | --- | --- | --- |
| P(1, 1) | 0 | P(2, 1) | 0 | P(3, 1) | 0 |
| P(1, 2) | 4 | P(2, 2) | 4 | P(3, 2) | 4 |
| P(1, 3) | 8 | P(2, 3) | 8 | P(3, 3) | 8 |
| P(1, 4) | 12 | P(2, 4) | 12 | P(3, 4) | 12 |

As shown in Table 1, the initial access probe message of each sequence is transmitted at a power of 0 dBm, and each for each subsequent access probe message of the sequence, the transmission power is increased by 4 dB (an intra-sequence power step of 4 dB). However, these values do not change for the second and third sequences (an inter-sequence power step of 0 dB). It should be understood that dBm represents the power ratio in decibels (dB) of the measured power referenced to one milliwatt. Thus, dBm refers to an absolute power, while dB refers to a difference in power. WCD 101 may receive the initial access probe power and the intra-sequence power step from the RAN in a system parameters message, access parameters message, or some other type of message.

TABLE 2

Initial access probe message power of 0 dBm, with an intra-sequence power step of 4 dB and an inter-sequence power step of 2 dB.

| Access Probe Message | Power (dBm) | Access Probe Message | Power (dBm) | Access Probe Message | Power (dBm) |
| --- | --- | --- | --- | --- | --- |
| P(1, 1) | 0 | P(2, 1) | 2 | P(3, 1) | 4 |
| P(1, 2) | 4 | P(2, 2) | 6 | P(3, 2) | 8 |

TABLE 2-continued

Initial access probe message power of 0 dBm, with an intra-sequence power step of 4 dB and an inter-sequence power step of 2 dB.

| Access Probe Message | Power (dBm) | Access Probe Message | Power (dBm) | Access Probe Message | Power (dBm) |
|---|---|---|---|---|---|
| P(1, 3) | 8 | P(2, 3) | 10 | P(3, 3) | 12 |
| P(1, 4) | 12 | P(2, 4) | 14 | P(3, 4) | 16 |

Table 2 shows another possible pattern of access probe message power. In Table 2, the initial access probe power is still 0 dBm, and the intra-sequence power step is still 4 dB. However, the power of each initial access probe increases by 2 dB in each subsequent sequence (an inter-sequence power step of 2 dB). For purposes of example, it is assumed that BTS 204 is further away from WCD 101 than BTS 202, and/or that WCD 101 receives stronger signals from BTS 202 than from BTS 204. Thus, WCD 101 may transmit access probe P(2,1) with more power than WCD 101 transmits access probe P(1, 1) in order to compensate for the increased distance between WCD 101 and BTS 204, and/or any additional attenuation on the air interface between WCD 101 and BTS 204.

Progressively increasing the initial access probe of each sequence, while maintaining the intra-sequence power increases of Table 1, has the overall result that each message of a subsequent access probe sequence will be transmitted at a higher power than a corresponding message in the previous access probe sequence. Nonetheless, there are situations in which it may be more advantageous for a WCD to decrease the power at which it transmits access probe messages of a subsequent sequence.

III. Decreasing Access Probe Power Based on BTS and Battery Life Considerations The more BTSs to which a WCD sends sequences of access probe messages, the more likely that the WCD will receive a relatively poor level of service from the BTS that eventually responds. Suppose that, in the context of FIG. 4, WCD 101 receives a response from BTS 206 after sending access probe sequences to BTS 202, BTS 204, and then BTS 206. BTS 206 may be further from WCD 101 than either of the other BTSs. Alternatively or additionally, WCD 101 may receive signals from BTS 206 with less strength than from the other BTSs. Therefore, a call that WCD 101 establishes via a wireless coverage area defined by BTS 206 may have a lower overall quality than calls that WCD 101 may have established via wireless coverage areas defined by the other BTSs. Therefore, it is desirable for a WCD to establish a call via a BTS that defines a more preferred wireless coverage area than a BTS that defines a less preferred wireless coverage area.

Further, both the process of acquiring a traffic channel from such a less-preferred wireless coverage area, as well as using this wireless coverage area for transmission of bearer data via that traffic channel, may have a negative impact on WCD battery life. The act of transmitting more than a few access probes may drain battery life. Additionally, if the WCD establishes a call via a geographically distant BTS or a BTS from which the WCD receives relatively weak signals, the WCD may have to transmit bearer data with a high level of power to increase the likelihood that this bearer data arrives at the BTS with sufficient signal strength for the BTS to detect. Thus, conducting a call via a less-preferred wireless coverage area may also consume battery life.

In at least some scenarios, there may be a tradeoff between call establishment success rates and battery life. For a WCD with a low remaining battery life, it may be preferable to allow some call establishments to fail if those call establishments, or the calls that might ensue therefrom, are likely to drain the WCD's battery life at an excessive rate. In these situations, the WCD might be able to preserve battery life by waiting until the WCD is able to establish a call via a more preferable wireless coverage area.

TABLE 3

Initial access probe message power of 0 dBm, with an intra-sequence power step of 4 dB and an inter-sequence power step of −2 dB.

| Access Probe Message | Power (dBm) | Access Probe Message | Power (dBm) | Access Probe Message | Power (dBm) |
|---|---|---|---|---|---|
| P(1, 1) | 0 | P(2, 1) | −2 | P(3, 1) | −4 |
| P(1, 2) | 4 | P(2, 2) | 2 | P(3, 2) | 0 |
| P(1, 3) | 8 | P(2, 3) | 6 | P(3, 3) | 4 |
| P(1, 4) | 12 | P(2, 4) | 10 | P(3, 4) | 8 |

TABLE 4

Initial access probe message power of 4 dBm, with an intra-sequence power step of 4 dB and an inter-sequence power step of −4 dB.

| Access Probe Message | Power (dBm) | Access Probe Message | Power (dBm) | Access Probe Message | Power (dBm) |
|---|---|---|---|---|---|
| P(1, 1) | 4 | P(2, 1) | 0 | P(3, 1) | −4 |
| P(1, 2) | 8 | P(2, 2) | 4 | P(3, 2) | 0 |
| P(1, 3) | 12 | P(2, 3) | 8 | P(3, 3) | 4 |
| P(1, 4) | 16 | P(2, 4) | 12 | P(3, 4) | 8 |

Therefore, in some embodiments, the WCD may transmit access probe messages at power levels in accordance with Table 3 or Table 4. In Table 3, the initial access probe message power is 0 dBm, the intra-sequence power step is 4 dB, and inter-sequence power step is −2 dB. In Table 4, the initial access probe message power is 4 dBm, the intra-sequence power step is 4 dB, and inter-sequence power step is −4 dB. Thus, for both Tables 3 and 4, less power is used for each consecutive access probe message sequence that the WCD transmits.

The WCD may receive instructions from the RAN regarding the access probe power levels and/or power steps. For example, in the case of Tables 3 and 4, the RAN may inform the WCD of the initial access probe power, the intra-sequence power step and the inter-sequence power step, and the WCD may employ these values when transmitting access probe messages. On the other hand, the WCD may use alternate values. For example, the RAN may inform the WCD of the initial access probe power and the intra-sequence power step, but the WCD may independently determine to apply an inter-sequence power step. For example, the WCD might apply the inter-sequence power step when its remaining battery life is low or when it is in a power-saving mode.

The embodiments exemplified by Tables 3 and 4 may reduce the likelihood that a user will experience a call of poor quality. By using a negative inter-sequence power step, these embodiments make it less likely that the RAN will receive access probe messages sent in sequences other than the first sequence. Further, in the embodiment of Table 4, the WCD uses a much higher initial access probe power than other embodiments. This makes it more likely that the WCD will receive a response to access probe messages transmitted in the first sequence. Consequently, it is also more likely that the WCD will communicate to the RAN via a more preferred wireless coverage area and therefore use less battery life during the call.

However, a side-effect of the embodiments of Tables 3 and 4 is that the WCD may experience more call failures. Given that call establishment success can be traded off with battery drain rates, it may be advantageous for this tradeoff to be under control of the WCD's user. For instance, the WCD may present the user with a "power-save" setting. When the user activates this setting, the WCD may enter a power-save mode, in which it uses a negative inter-sequence power step, such as those in FIGS. 3 and 4. In this way, the user can decide whether it is more important for a call to succeed or for battery life to be preserved.

On the other hand, use of a negative inter-sequence power step may be automatically triggered by the WCD determining that its remaining battery life is below a battery life threshold. For instance, if the battery life threshold is 20%, then when the remaining battery life is below 20%, the WCD may use a negative inter-sequence power step. However, when the remaining battery life is at or above 20%, the WCD may use a neutral or positive inter-sequence power step. Other remaining battery life thresholds, such as 50% or 10%, may be used in addition to or instead of the battery life threshold 20%. Each battery life threshold may be associated with a different inter-sequence power step. For instance, when the WCD's remaining battery life is less than or equal to 20% but more than 10%, the WCD may use an inter-sequence power step of −2 dB. However, when the WCD's remaining battery life is less than or equal to 10%, the WCD may use an inter-sequence power step of −4 dB.

Additionally, the extent of the power step may be based on the remaining battery life. Thus, for example, if the remaining battery life is below 20%, the WCD may use an inter-sequence power step of −2 dB, but when the remaining battery life is below 10%, the WCD may use an inter-sequence power step of −4 dB. The WCD may adjust the initial access probe power and the intra-sequence power step based on remaining battery life as well.

Figure 5:
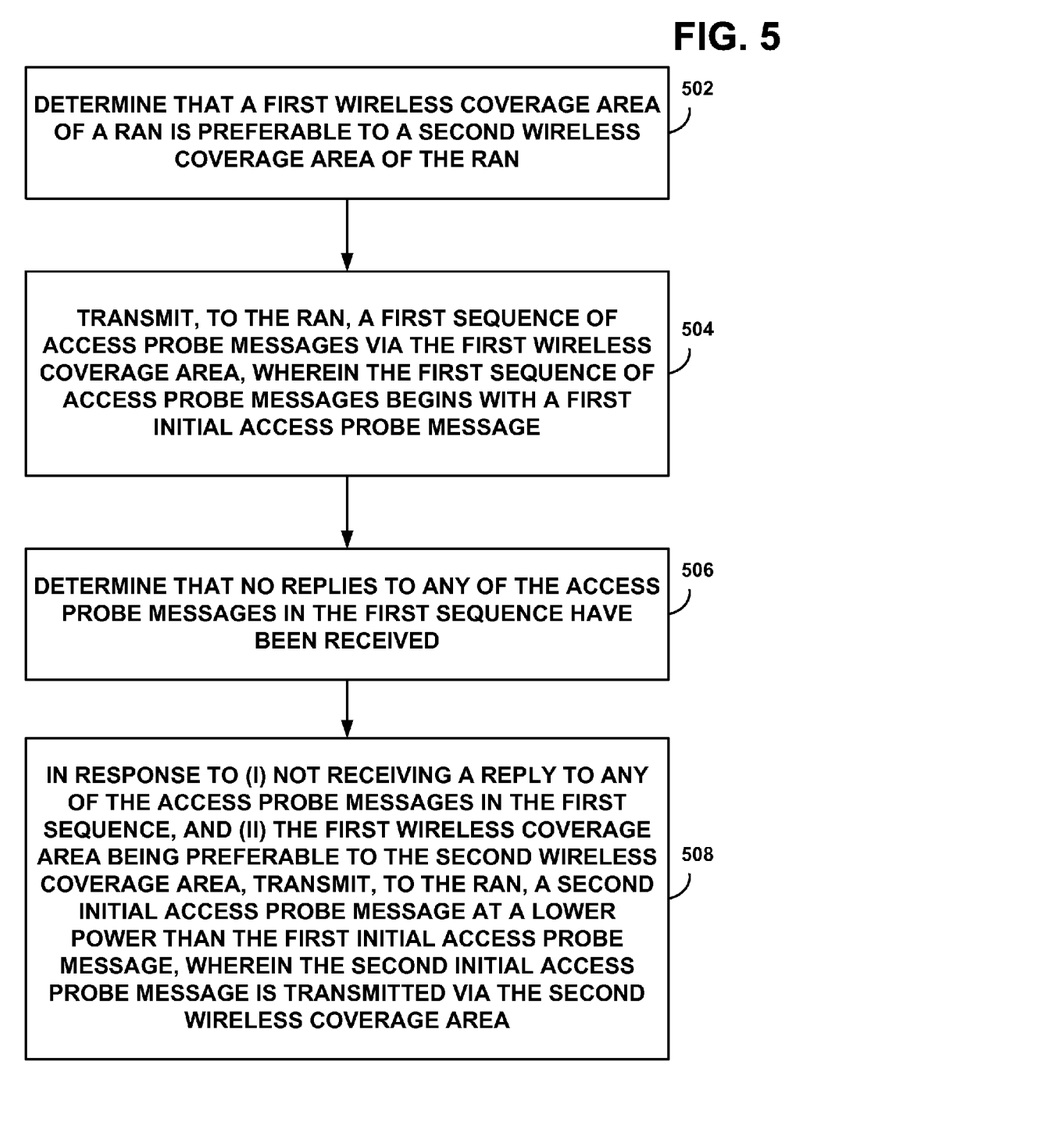
FIG. 5 is a first flow chart, in accordance with an example embodiment.

FIG. 5 provides an example embodiment in which a WCD may use a negative inter-sequence power step. At step 502, a WCD may determine that a first wireless coverage area of a RAN is preferable to a second wireless coverage area of the RAN. At step 504, the WCD may transmit, to the RAN, a first sequence of access probe messages. The WCD may transmit the first sequence of access probe messages via the first wireless coverage area, and the first sequence of access probe messages may begin with a first initial access probe message.

At step 506, the WCD may determine that the WCD has not received replies to any of the access probe messages in the first sequence. Then, at step 508, in response to (i) not receiving a reply to any of the access probe messages in the first sequence, and (ii) the first wireless coverage area being preferable to the second wireless coverage area, the WCD may transmit, to the RAN, a second initial access probe message at a lower power than the WCD transmits the first initial access probe message. The WCD may transmit the second initial access probe message via the second wireless coverage area.

Optionally, the WCD may condition transmitting the second initial access probe message at a lower power than the WCD transmits the first initial access probe message on the remaining battery life of the WCD not meeting the battery life threshold. Thus, the WCD may also determine that the remaining battery life of the WCD does not meet a battery life threshold (such a threshold may take on values such as 50% or less, 20% or less, 10% or less, etc.), and then lower the power of the second initial access probe message accordingly.

Figure 6:
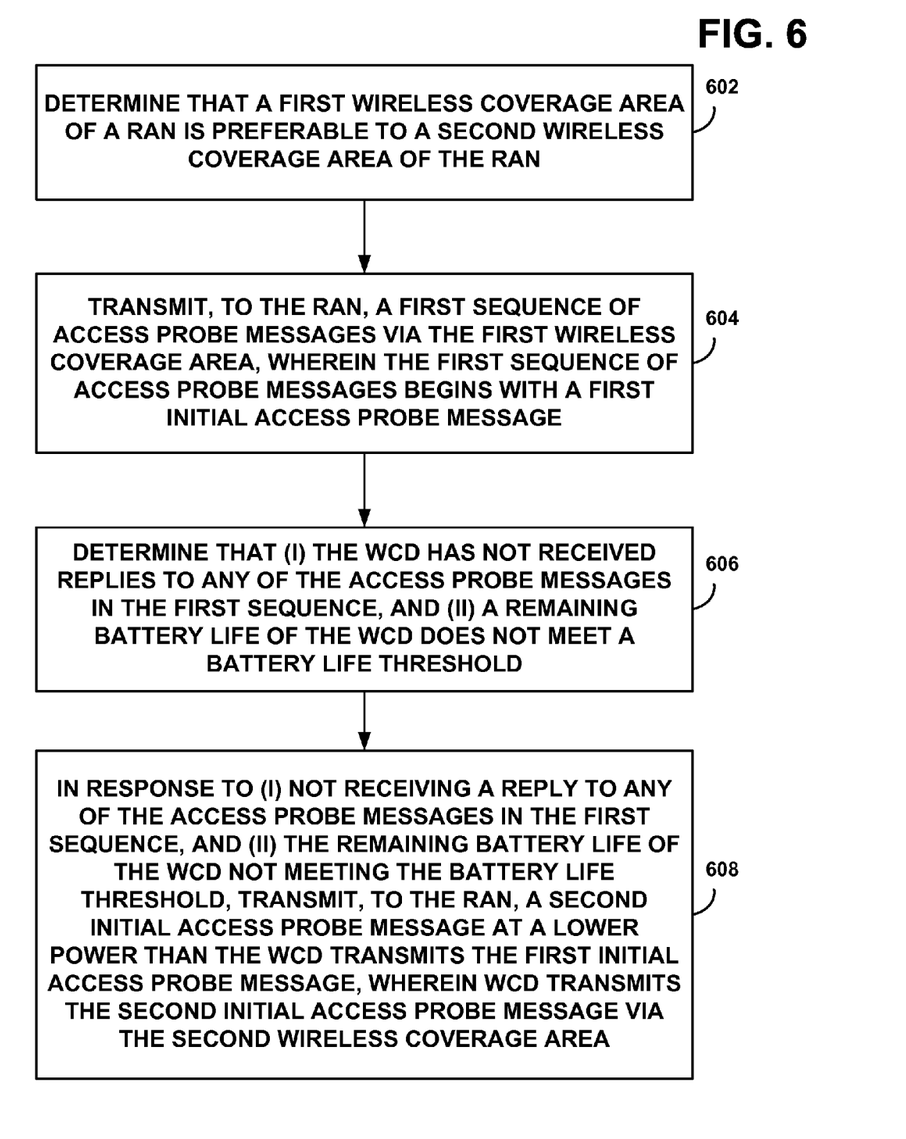
FIG. 6 is a second flow chart, in accordance with an example embodiment.

FIG. 6 provides another example embodiment through which a WCD may use a negative inter-sequence power step. At step 602, a WCD may determine that a first wireless coverage area of a RAN is preferable to a second wireless coverage area of the RAN. At step 604, the WCD may transmit, to the RAN, a first sequence of access probe messages. The WCD may transmit the first sequence of access probe messages via the first wireless coverage area, and the first sequence of access probe messages may begin with a first initial access probe message.

At step 606, the WCD may determine that (i) the WCD has not received replies to any of the access probe messages in the first sequence, and (ii) a remaining battery life of the WCD does not meet a battery life threshold. Then, at step 608, in response to (i) not receiving a reply to any of the access probe messages in the first sequence, and (ii) the remaining battery life of the WCD not meeting the battery life threshold, the WCD may transmit, to the RAN, a second initial access probe message at a lower power than the WCD transmits the first initial access probe message. The WCD may transmit the second initial access probe message via the second wireless coverage area. The remaining battery life threshold may be, for example, 50% or less, 20% or less, 10% or less, etc.

For the embodiments of both FIGS. 5 and 6, the second initial access probe message may begin a second sequence of access probe transmissions by the WCD, in which the WCD uses less power than the WCD used to transmit each access probe message in the first sequence. Alternatively or additionally, the second initial access probe message may begin a second sequence of access probe transmissions by the WCD, such that each access probe message in the second sequence is transmitted using a second power level and each access probe message in the first sequence is transmitted using a first power level.

Further, the WCD may receive, from the RAN, an initial access probe power indication for the second wireless coverage area, and the WCD may transmit the second initial access probe message at a lower power than the indicated initial access probe power. The WCD may also receive an intra-sequence power step indication, and/or an inter-sequence power step indication from the RAN. Similarly, the WCD may transmit access probe messages according to these parameters, or may override the parameters.

In optional aspects of these embodiments, a first base station may define the first wireless coverage area and a second base station may define the second wireless coverage area. Then, determining that the first wireless coverage area is preferable to the second wireless coverage area may involve determining a first distance between the WCD and the first base station, determining a second distance between the WCD and the second base station, and determining that the first distance is less than the second distance. Alternatively or additionally, determining that the first wireless coverage area is preferable to the second wireless coverage area may involve determining that the WCD receives signals from the first wireless coverage area with a greater strength than the WCD receives signals from the second wireless coverage area. In either case, WCD may determine that the first wireless coverage area is preferable to the second wireless coverage area as a target for establishment of a call in which the WCD participates.

Moreover, the WCD may receive a list of wireless coverage areas from the RAN. The list may include the first wireless coverage area and the second wireless coverage area. The WCD may sort the list in order of preferences of the respective wireless coverage areas included therein. The WCD may determine that the first wireless coverage area is preferable to the second wireless coverage area based on the ordering of the list.

It should be understood that the flow charts of FIGS. 5 and 6 are non-limiting embodiments. Thus, more or fewer steps than shown in FIGS. 5 and 6 may be used without departing from the scope of the invention. Additionally, any of these steps may be repeated one or more times, or may be omitted altogether. Moreover, these steps may occur in a different order than shown in FIGS. 5 and 6. Further, these flow charts may be combined with one another, in whole or in part, also without departing from the scope of the invention.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
   a wireless communication device (WCD) determining that a first wireless coverage area of a radio access network (RAN) is preferable to a second wireless coverage area of the RAN;
   the WCD transmitting, to the RAN, a first sequence of access probe messages, wherein the WCD transmits the first sequence of access probe messages via the first wireless coverage area, and wherein the first sequence of access probe messages begins with a first initial access probe message;
   the WCD determining that a remaining battery life of the WCD does not meet a battery life threshold;
   the WCD determining that the WCD has not received replies to any of the access probe messages in the first sequence; and
   in response to (i) not receiving a reply to any of the access probe messages in the first sequence, (ii) the first wireless coverage area being preferable to the second wireless coverage area, and (iii) the remaining battery life of the WCD not meeting the battery life threshold, the WCD transmitting, to the RAN, a second initial access probe message at a lower power than the WCD transmits the first initial access probe message, wherein WCD transmits the second initial access probe message via the second wireless coverage area.

2. The method of claim 1, wherein the second initial access probe message begins a second sequence of access probe transmissions by the WCD, and wherein the WCD uses less power to transmit each access probe message in the second sequence than the WCD uses to transmit each access probe message in the first sequence.

3. The method of claim 1, wherein the second initial access probe message begins a second sequence of access probe transmissions by the WCD, and wherein each access probe message in the first sequence is transmitted using a first power and each access probe message in the second sequence is transmitted using a second power.

4. The method of claim 1, further comprising:
   the WCD receiving, from the RAN, an initial access probe power indication for the second wireless coverage area, wherein the WCD transmits the second initial access probe message at a lower power than the indicated initial access probe power.

5. The method of claim 1, wherein a first base station defines the first wireless coverage area and a second base station defines the second wireless coverage area, and wherein determining that the first wireless coverage area is preferable to the second wireless coverage area comprises:
   determining a first distance between the WCD and the first base station;
   determining a second distance between the WCD and the second base station; and
   determining that the first distance is less than the second distance.

6. The method of claim 1, wherein determining that the first wireless coverage area is preferable to the second wireless coverage area comprises determining that the WCD receives signals from the first wireless coverage area with a greater strength than the WCD receives signals from the second wireless coverage area.

7. The method of claim 1, wherein the WCD determines that the first wireless coverage area is preferable to the second wireless coverage area as a target for establishment of a call in which the WCD participates.

8. The method of claim 1, further comprising:
   the WCD receiving a list of wireless coverage areas from the RAN, the list including the first wireless coverage area and the second wireless coverage area; and
   the WCD sorting the list in order of preferences of the respective wireless coverage areas included therein, wherein determining that the first wireless coverage area is preferable to the second wireless coverage area is based on the ordering of the list.

9. The method of claim 1, wherein the remaining battery life is 10% or less.

10. An article of manufacture including a non-transitory computer-readable medium, having stored thereon program instructions that, upon execution by a wireless communication device (WCD), cause the WCD to perform operations comprising:
    determining that a first wireless coverage area of a radio access network (RAN) is preferable to a second wireless coverage area of the RAN;
    transmitting, to the RAN, a first sequence of access probe messages, wherein the WCD transmits the first sequence of access probe messages via the first wireless coverage area, and wherein the first sequence of access probe messages begins with a first initial access probe message;
    determining that a remaining battery life of the WCD does not meet a battery life threshold;
    determining that the WCD has not received replies to any of the access probe messages in the first sequence; and
    in response to (i) not receiving a reply to any of the access probe messages in the first sequence, (ii) the first wireless coverage area being preferable to the second wireless coverage area, and (iii) the remaining battery life of the WCD not meeting the battery life threshold, transmitting, to the RAN, a second initial access probe message at a lower power than the WCD transmits the first initial access probe message, wherein WCD transmits the second initial access probe message via the second wireless coverage area.

11. The article of manufacture of claim 10, wherein the second initial access probe message begins a second sequence of access probe transmissions by the WCD, and wherein the WCD uses less power to transmit each access probe message in the second sequence than the WCD uses to transmit each access probe message in the first sequence.

12. The article of manufacture of claim 10, wherein the second initial access probe message begins a second sequence of access probe transmissions by the WCD, and wherein each access probe message in the first sequence is transmitted using a first power and each access probe message in the second sequence is transmitted using a second power.

13. The article of manufacture of claim 10, wherein the program instructions, upon execution by the WCD, cause the WCD to perform operations further comprising:
   receiving, from the RAN, an initial access probe power indication for the second wireless coverage area, wherein the WCD transmits the second initial access probe message at a lower power than the indicated initial access probe power.

14. The article of manufacture of claim 10, wherein a first base station defines the first wireless coverage area and a second base station defines the second wireless coverage area, and wherein determining that the first wireless coverage area is preferable to the second wireless coverage area comprises:
   determining a first distance between the WCD and the first base station;
   determining a second distance between the WCD and the second base station; and
   determining that the first distance is less than the second distance.

15. The article of manufacture of claim 10, wherein determining that the first wireless coverage area is preferable to the second wireless coverage area comprises determining that the WCD receives signals from the first wireless coverage area with a greater strength than the WCD receives signals from the second wireless coverage area.

16. The article of manufacture of claim 10, wherein the WCD determines that the first wireless coverage area is preferable to the second wireless coverage area as a target for establishment of a call in which the WCD participates.

17. The article of manufacture of claim 10, wherein the program instructions, upon execution by the WCD, cause the WCD to perform operations further comprising:
   receiving a list of wireless coverage areas from the RAN, the list including the first wireless coverage area and the second wireless coverage area; and
   sorting the list in order of preferences of the respective wireless coverage areas included therein, wherein determining that the first wireless coverage area is preferable to the second wireless coverage area is based on the ordering of the list.

18. A method comprising:
   a wireless communication device (WCD) determining that a first wireless coverage area of a radio access network (RAN) is preferable to a second wireless coverage area of the RAN;
   the WCD transmitting, to the RAN, a first sequence of access probe messages, wherein the WCD transmits the first sequence of access probe messages via the first wireless coverage area, and wherein the first sequence of access probe messages begins with a first initial access probe message;
   the WCD determining that (i) the WCD has not received replies to any of the access probe messages in the first sequence, and (ii) a remaining battery life of the WCD does not meet a battery life threshold; and
   in response to (i) not receiving a reply to any of the access probe messages in the first sequence, and (ii) the remaining battery life of the WCD not meeting the battery life threshold, the WCD transmitting, to the RAN, a second initial access probe message at a lower power than the WCD transmits the first initial access probe message, wherein WCD transmits the second initial access probe message via the second wireless coverage area.

* * * * *